Figure 1:
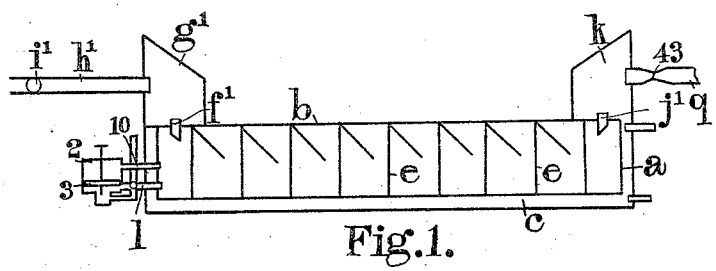

No. 842,846. PATENTED JAN. 29, 1907.
T. H. GLASSCOE.
CARBURETED AIR APPARATUS.
APPLICATION FILED SEPT. 10, 1906.

7 SHEETS—SHEET 1.

No. 842,846. PATENTED JAN. 29, 1907.
T. H. GLASSCOE.
CARBURETED AIR APPARATUS.
APPLICATION FILED SEPT. 10, 1906.
7 SHEETS—SHEET 3.
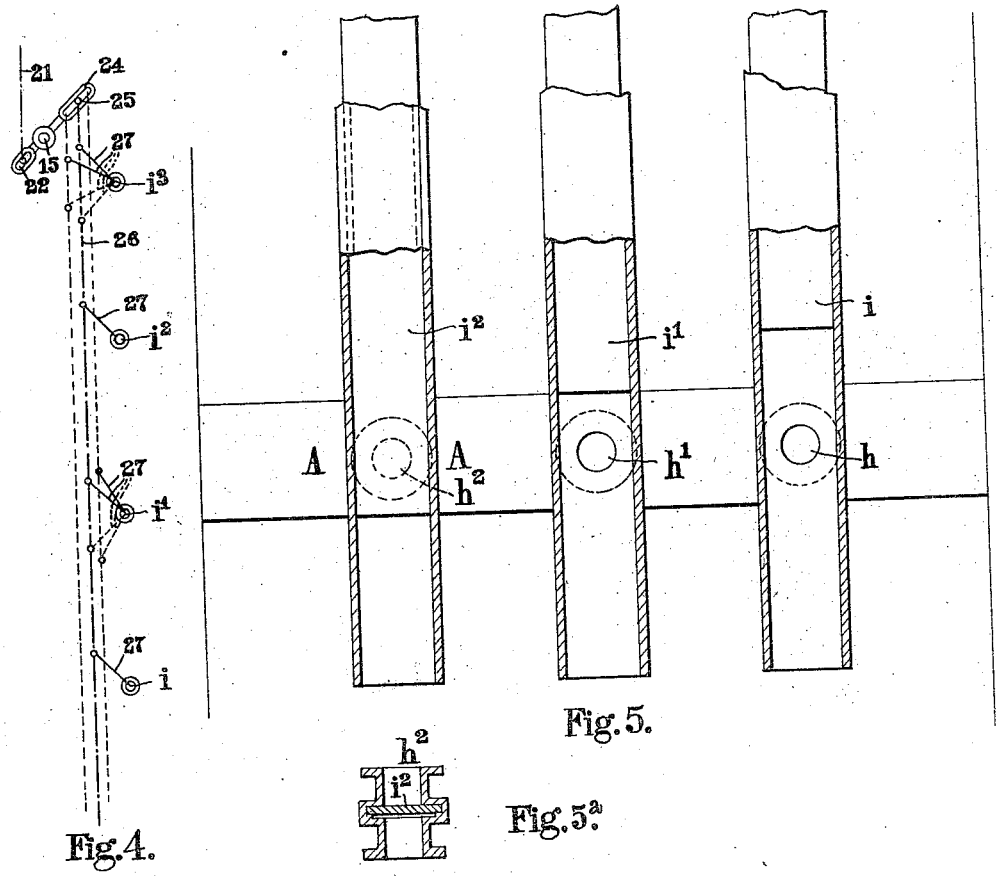

No. 842,846. PATENTED JAN. 29, 1907.
T. H. GLASSCOE.
CARBURETED AIR APPARATUS.
APPLICATION FILED SEPT. 10, 1906.

7 SHEETS—SHEET 4.

No. 842,846. PATENTED JAN. 29, 1907.
T. H. GLASSCOE.
CARBURETED AIR APPARATUS.
APPLICATION FILED SEPT. 10, 1906.

7 SHEETS—SHEET 5.

No. 842,846. PATENTED JAN. 29, 1907.
T. H. GLASSCOE.
CARBURETED AIR APPARATUS.
APPLICATION FILED SEPT. 10, 1906.

7 SHEETS—SHEET 6.

Attest
C. S. Middleton
E. N. Santon

Inventor
Thomas H. Glasscoe
By Spear Middleton Donaldson Spear.
Attys.

No. 842,846. PATENTED JAN. 29, 1907.
T. H. GLASSCOE.
CARBURETED AIR APPARATUS.
APPLICATION FILED SEPT. 10, 1906.

7 SHEETS—SHEET 7.

UNITED STATES PATENT OFFICE.

THOMAS HENRY GLASSCOE, OF WANSTEAD, ENGLAND.

CARBURETED-AIR APPARATUS.

No. 842,846.	Specification of Letters Patent.	Patented Jan. 29, 1907.

Application filed September 10, 1906. Serial No. 334,019.

*To all whom it may concern:*

Be it known that I, THOMAS HENRY GLASSCOE, a subject of the King of Great Britain and Ireland, residing at Ivydale, Herongate Road, Wanstead, in the county of Essex, England, have invented certain new and useful Improvements in and Relating to Carbureted-Air Apparatus, of which the following is a specification.

My invention relates to improvements in apparatus for producing carbureted air.

The object of the present invention is to provide for automatically maintaining constant the proportion of hydrocarbon in the gas coming from the carbureter in accordance with the demand, the pressure being constant.

A further object of my invention is to provide an improved arrangement of carbureter in which the employment of a single carbureter element for large outputs with the attendant difficulties of regulation are avoided.

My invention consists in maintaining the proportion of hydrocarbon in the carbureted fluid substantially constant by automatically controlling in accordance with the demand or at constant pressure in accordance with the temperature the amount of carbureter-surface in operation, more surface being exposed as the demand increases or the temperature decreases, and vice versa.

The invention also consists in constructing the carbureter in sections or elements, each of which has an air-inlet pipe and gas-outlet pipe, in each or one of which pipes is a valve, the valves of the various sections or elements being automatically controlled in accordance with the demand or thermostatically in accordance with the temperature, so that when the demand for carbureted air decreases or increases or the quality of the gas produced becomes richer or poorer, due to temperature changes, one or more sections or elements of the carbureter are automatically put out of or into operation in succession, respectively, by the movements of the gas-holder due to the changes of demand or by thermostats affected by temperature change in order to maintain the proportion of hydrocarbon in the gas practically constant.

The invention further consists in providing a carbureter with means automatically actuated in accordance with the demand for or the quality of the gas, whereby the supply of heating fluid to the carbureter may be regulated in such a manner that when more carbureted air is required a greater volume of heating fluid is supplied to the carbureter-jacket, and vice versa.

The invention further consists in providing a carbureter with an improved external valve-controlled oil-feed chamber, hereinafter described, having in addition to an oil-supply pipe to the carbureter means for equalizing the pressures in the oil-chamber and carbureter.

The invention also consists in the improved constructions and arrangements hereinafter described.

Figure 2:
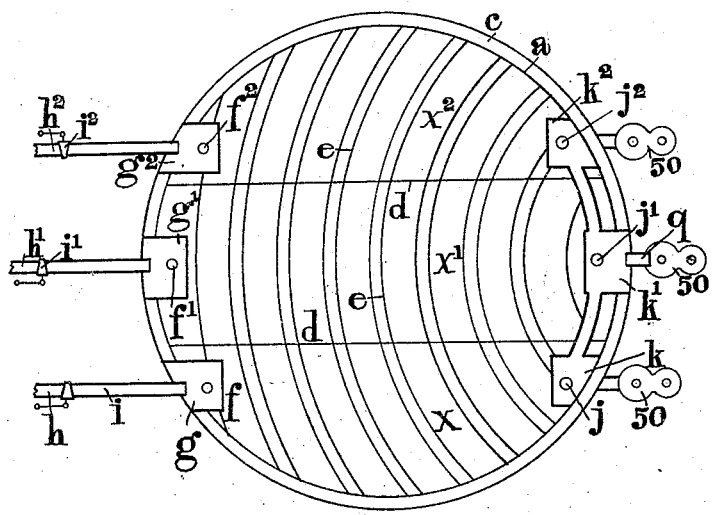
Figure 3:
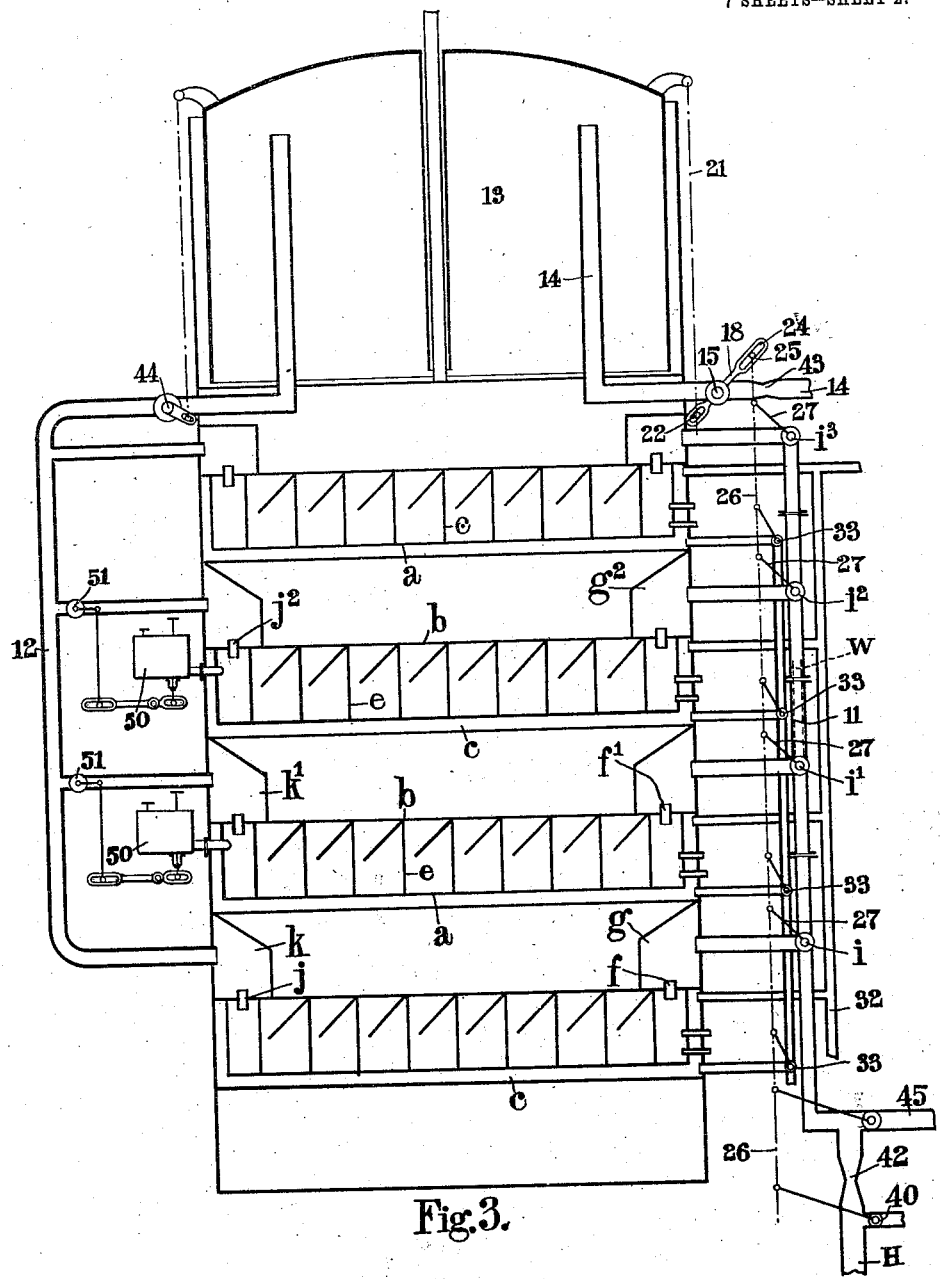
Figure 6:
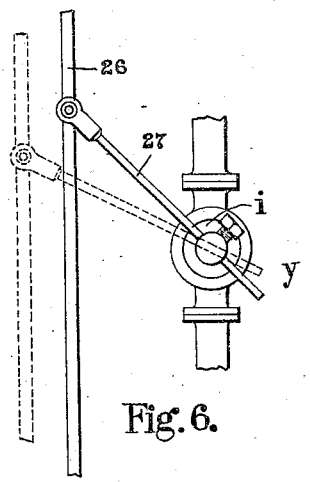
Figure 7:
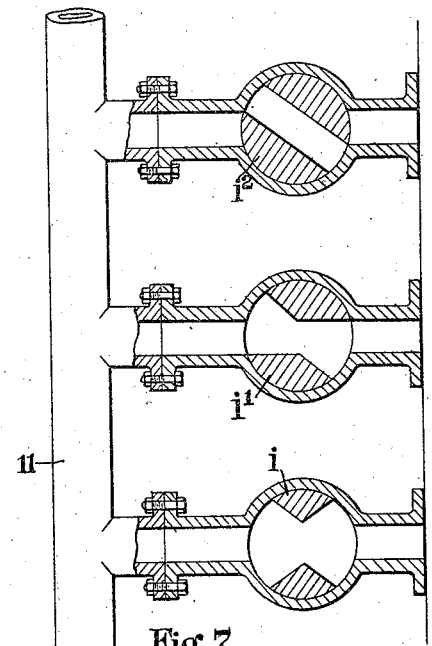
Figures 8, 9:
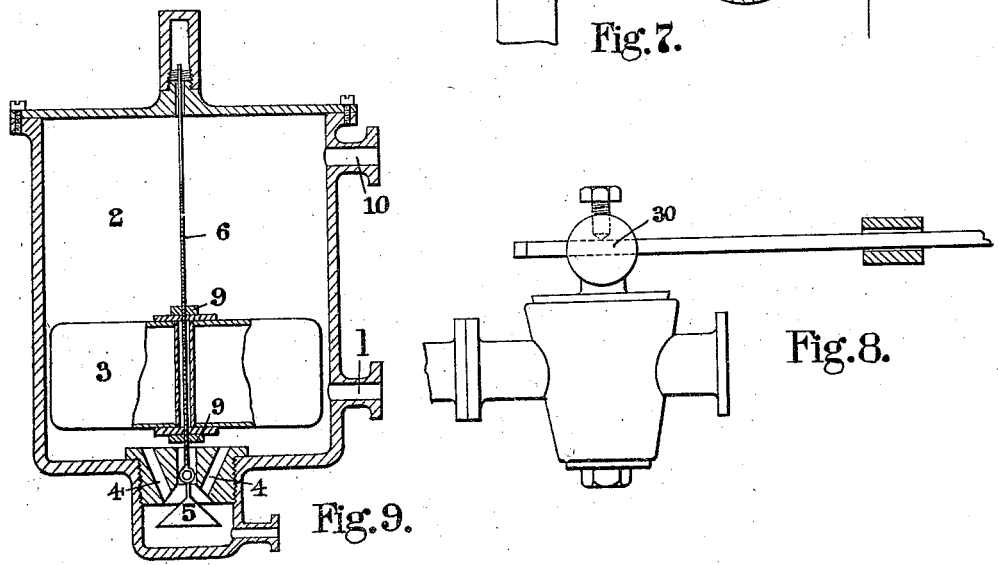
Figure 10:
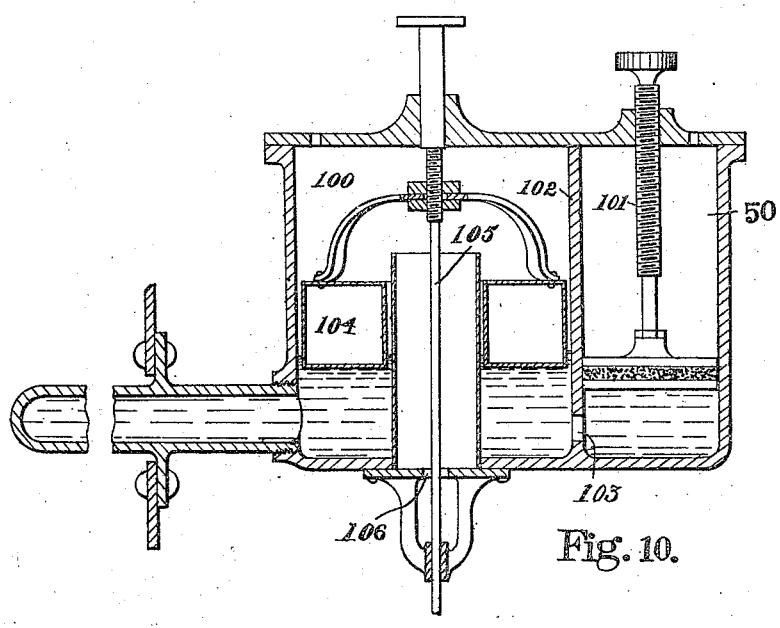
Figure 11:
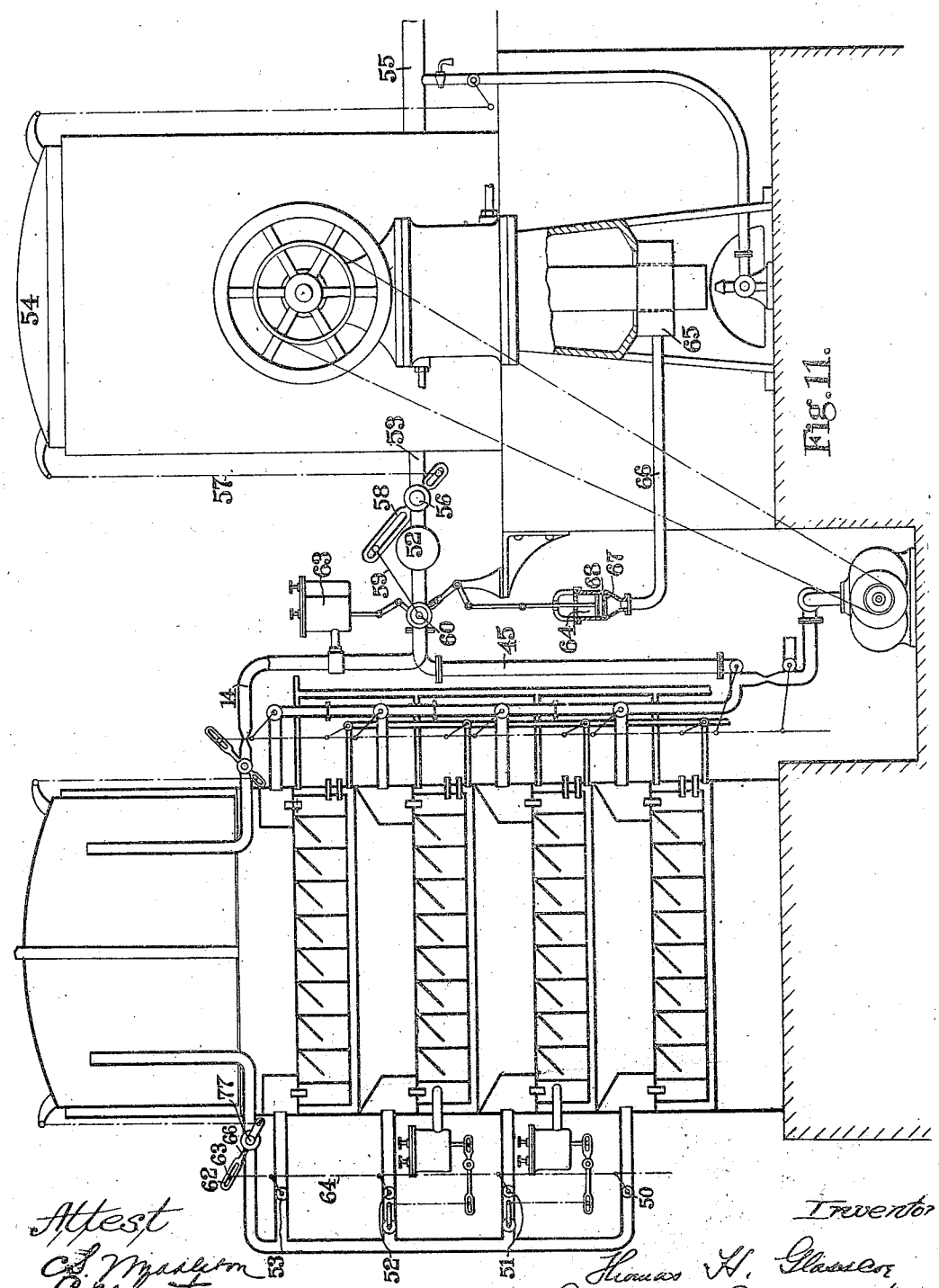
Figure 12:
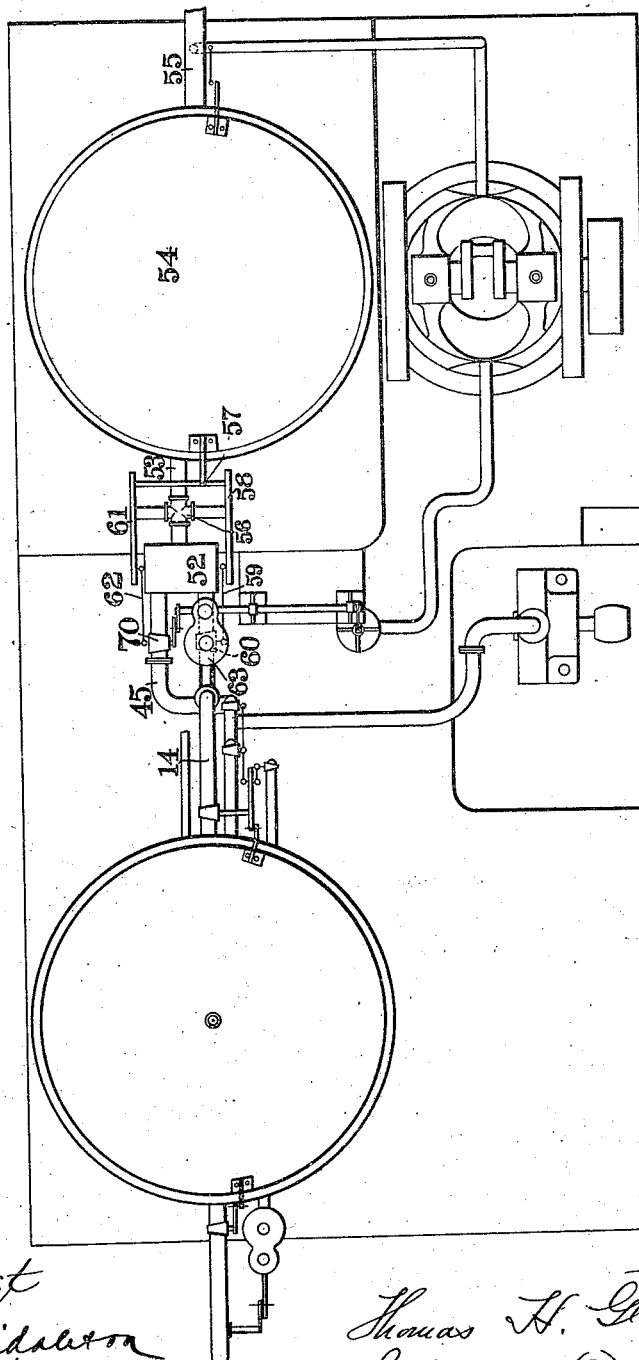

Referring now to the accompanying diagrams, Figures 1 and 2 are central sectional elevation and plan, respectively, of a carbureter in sections side by side. Fig. 3 is a vertical sectional elevation of a stack of carbureter elements. Fig. 4 is a diagram showing the movements imparted to the valve-levers with various adjustments. Fig. 5 is a view showing an arrangement of slide-valves for use in controlling a carbureter divided into sections, as shown in Fig. 2, two of the sections being in operation and one closed. Fig. 5$^a$ is a sectional plan on the line A A of Fig. 5. Fig. 6 is a detail view of a valve and its adjustable connection with the vertical rod operated from the movement of the bell. Fig. 7 illustrates an arrangement of valves or cocks for controlling the air-openings to the sections or elements of a carbureter. Fig. 8 is a separate view of one of the cocks seen in section in Fig. 7. Fig. 9 is a sectional elevation of an external oil-feed chamber according to my invention. Fig. 10 is a sectional elevation of one of the thermostats shown at 50 in Fig. 3. Fig. 11 is a view similar to Fig. 3, but showing in connection with the apparatus shown in Fig. 3 a second bell and mechanism associated therewith. Fig. 12 is a plan view of the apparatus shown in Fig. 11.

In carrying my invention into effect in one manner I arrange to put various sections of a carbureter successively and automatically into or out of operation, according to the demand. The carbureter consists in one form of a shallow circular chamber $a$, closed at the top $b$ and provided with suitable means for heating it—as, for instance, a jacket $c$ of hot gases, hot water, or steam—these heating means being preferably under control, as is hereinafter described.

The carbureter is divided by partitions $d\ d$ into three sections $x$, $x'$, and $x^2$. Its interior is provided with curved partitions $e\ e$, extending from the bottom to the top, the partitions being composed of wire-gauze and absorbent material.

At the top of the sections $x$, $x'$, and $x^2$ I provide openings $f$, $f'$, and $f^2$, communicating with boxes or chests $g$, $g'$, and $g^2$, into which the air-supply may be delivered through pipes $h$, $h'$, and $h^2$ from a suitable pump or blower.

On the opposite side of the carbureter I provide similar openings $j$, $j'$, and $j^2$ and boxes $k$, $k'$, and $k^2$ for the carbureter air-outlet, these boxes being preferably connected together and provided with a common outlet-pipe $q$, leading to a receptacle capable of expanding to accommodate various volumes, such as a gas-holder or the like.

Oil is admitted to the carbureter preferably near the air-inlet and near the bottom of the carbureter by a pipe $l$ from any suitable external oil-supply chamber 2. The form of oil-supply chamber which I prefer is that illustrated in Fig. 9, in which the chamber 2 contains a float 3, which controls an inlet 4 by a valve 5. The float is guided by means of a spindle 6, provided with a screwed portion and nuts 9, whereby the position of the float may be adjusted. The upper portion of the supply-chamber 2 is connected by a pipe 10 with the carbureter, whereby an effective equalization of the pressures is obtained.

There is preferably an oil-feed device for each section of the carbureter; but one common to all of the sections may be provided, if desired, having means for supplying each section from it.

The air is blown through one or more sections of the carbureter, becoming carbureted by its passage through the absorbent partitions, and leaves by the outlet $q$, whence it passes to a gas-holder or the like.

In each of the air-supply pipes $h$ $h'$ $h^2$ is a valve or cock $i$ $i'$ $i^2$, respectively, controlled by the movements of the gas-holder or other part of the apparatus having movements in accordance with the fluctuations of the demand. Slide-valves, such as those shown diagrammatically in Fig. 5, may be used, or cocks, as shown in Fig. 7, the valves or cocks being so arranged that when the demand is small the air is supplied to one section of the carbureter only—say to section $x$—the other sections $x'$ and $x^2$ being closed. When the demand increases, however, and the bell falls, another section—say $x'$—is added, and with a further increase in demand and consequent drop of the bell the other section $x^2$ is put into operation. While the maximum demand exists all the sections are in operation, but as the demand decreases and the bell rises first the section $x^2$ is put out of operation by the closure of its cock or valve $i^2$ and then, if the bell rise enough, the cock or valve $i'$. The valves or cocks may be operated in any convenient manner from a guided rod carried and actuated by the gas-holder.

For producing very large outputs of carbureted air I prefer to divide the carbureter into elements each of which may consist of a carbureter divided into sections, as above described, or may, if desired, be self-contained—that is, it may consist of a carbureter, as shown in Fig. 1, but without the partitions $d$ $d$, having only one air-inlet and one gas-outlet. The carbureter elements may in order to reduce space be arranged one above another in the form of a stack, as shown in Fig. 3, where a series of carbureter elements are shown, which are not divided into sections by partitions, each element having its own inlet and outlet. All the air-inlets are, however, branched from a common supply-pipe 11, and all the outlets discharge into a common uptake-pipe 12, leading to a gas-holder 13. The carbureted air is drawn from the gas-bell by a pipe 14.

As in the carbureter arrangement described with reference to Figs. 1 and 2, the air-supply pipes of the elements may be controlled by any convenient form of valve or cock actuated from the gas holder or bell. The type of cock shown in Fig. 7 is preferable generally to a slide-valve or series of slide-valves; but in some cases slide-valves may be used. The ports in the bodies of these valves are of determined size, but the way through the plug of the valves which come into action before the last one may be two or more times the size of the valve last opened, according to the number of elements employed. The heads 30, Fig. 8, of the valve-plugs may be made to fit adjustably upon octagonal shanks (not shown) in order that they may be placed in positions that will insure all the valve-levers being in the same position, notwithstanding the fact that the ports of the various valve-plugs may be in different positions—i. e., some closed and some opened.

I have found that the best manner of operating the valves or cocks from the gas-holder 13 is to provide the bell with a vertically-guided rod 21, Fig. 3, which engages with one slotted end 22 of a lever 18, mounted upon a fulcrum 15. The other end of the lever 18 is also slotted at 24 and contains a block which is free to slide or play in the slot. Pivotally attached to the block at 25 is a vertical rod 26, which is connected to the ends of the valve-levers 27 of the various air-valves $i$ $i'$ $i^2$ $i^3$ of the carbureter elements in any convenient manner—for example, as shown in Figs. 6 and 8.

I find in practice that it is important to be able to properly adjust these valves in relation to the movement of the bell, the maximum amount of which movement is of course always constant. For this purpose I fix the levers 27 of the air-valves in any manner which will allow of varying their effective lengths, such as that shown in Figs. 6 and 8. If, for example, as shown diagrammatically in Figs. 3, 4, and 6, the effective lengths of all the air-valve levers 27 be increased by the amount y, Fig. 6, the block will play in a different part of the slot 24, and although the angular movement of the lever 18 is not changed the angular movement of the levers 27 and consequent opening of the valves will be less. If the effective lengths be decreased, then of course the opening of the valves will be greater.

When the bell is in the position shown—i. e., with the bell in its lowest position—all the air-valves are open; but as it rises, due to a reduction in the demand, one or more of the valves are closed in succession, the reverse action taking place when the bell falls again.

In some cases, especially in large plant, it is desirable to provide valves in the outlets of the sections or elements of the carbureter plant, as well as in the inlets thereto, these outlet-valves being operated in a similar manner to the inlet-valves.

The carbureter is provided with a heating-jacket and with means for controlling the supply of heat thereto.

When the carbureter is used for supplying carbureted air to an internal-combustion engine or the like, I conduct the hot water from the engine-jacket into the heating-jacket of the carbureter to supply the heat necessary for replacing that lost by vaporization. I find it important, however, to control the supply of heat to the carbureter-jackets of the elements, for if one of the elements be out of operation and the same amount of heat be still supplied oil will be vaporized therein, and when that element is next put into operation an excessively rich gas will for a short period flow into the holder. To prevent this, I provide the hot-water-supply pipes 32, Fig. 3, of the various elements with valves or cocks 33, adapted to be operated in a similar manner to the air valves or cocks above described and so arranged that when a carbureter element is put out of operation by the closure of its air-valve the hot-fluid-supply pipe is also closed. This arrangement is illustrated diagrammatically in Fig. 3; but it will be understood that if the levers of the valves 33 are to be operated by the same vertical rod as actuates the air-valve levers it is desirable, though not necessary, to arrange the center of the water-pipe at about the same distance from the vertical rod as the vertical air-pipe is—i. e., in the position shown by dotted lines W in Fig. 3.

It will of course be understood that the valves operated in accordance with the demand only maintain constant the proportion of hydrocarbon per unit volume of the carbureted air produced so long as no substantial changes in the temperature take place, since the effect of considerable changes of temperature is to alter the quality of the gas produced. To counteract this effect, I prefer to employ one or more thermostats, such as that shown in Fig. 10, where a vessel is divided into two chambers 100 and 101, separated by a partition 102, in which is a communicating hole 103. Mercury is supplied to the chambers, and in the chamber 100 is a float 104, which supports a rod 105, passing through a tubular opening 106 in the bottom of the chamber and connected to an operating-lever or the like of a valve. The thermostats are actuated by changes of temperature of the atmosphere or by a flame of the gas produced, the thermostat or thermostats being adapted to control one or more valves 51 in the supply or supplies to or from the carbureters, as shown in Fig. 3. Thus if the temperature fall and a weaker gas be produced in consequence the thermostat will open one or more valves wider and allow more rich carbureted air to pass into the bell, or vice versa if the temperature rise. These valves may be placed at the outlets of one or more elements, or, as described in my former patent, No. 828,284, dated August 7, 1906, these valves may be placed concentrically within the other valves, or they may control separate carbureter elements.

The supply-pipe H of the carbureter plant is provided with an air-relief valve 40, adapted to be opened by the rise of the bell when a sudden decrease in the demand takes place. This valve is actuated by the movements of the gas-holder or other means having movements in accordance with the demand.

I prefer to make the inlet to the carbureter and the outlet therefrom in the form of a Venturi tube, as shown at 42 and 43 in Fig. 3.

The pipe delivering carbureted air to the bell is provided with a valve 44, actuated from the movements of the bell. This valve 44 is gradually opened or closed as the bell falls or rises, so that the admission of mixture into the bell shall be controlled in accordance with the demand. The pressure of gas within the bell is constant, the movements of the bell being in accordance with the volume. At predetermined heights the bell entirely closes or fully opens the valve. Although the volume of air available for delivery into the carbureter may be much greater than the demand for mixture, the pressure in the bell is prevented from rising appreciably by this valve in the inlet-pipe to the bell.

The gas in the bell may be used in some cases without further dilution; but when very dilute mixtures are required I take rich gas from the bell of the surface-controlled carbureter, mix it with pure air, and pass the mixture to a second expansive receptacle having movements in response to variations of demand—as, for instance, a bell—the proportion of air to gas being automatically controlled by means operated in accordance with the demand or thermostatically in accordance with the temperature. The pipe conveying mixture to the second bell is controlled by a valve in accordance with the movement of that bell, so as to keep the pressure therein constant, notwithstanding variations of demand. Means for effecting this are shown diagrammatically in Figs. 11 and 12, in which the rich carbureted air from the bell of the stack-carbureter is conveyed by the pipe 14, and pure air is led by pipe 45 to a mixing-chamber 52, whence the mixture passes by a pipe 53 into the second bell 54 and therefrom to the services by a pipe 55. In the rich-gas pipe is a valve 60 and in the air-pipe a valve 70. In the mixture-pipe 53 is a valve 56, operated by a rod 57, carried by the bell 54, the rod engaging with one end of a lever 58, attached to the valve-plug, the other end of the lever engaging a lever 59, attached to the valve 60 in the rich-gas pipe 14. A lever 61, similar to the lever 58, (see Fig. 12,) also operated by the movements of the bell, engages a lever 62, Fig. 12, fixed on the plug of the air-valve 70. The ports of the valves 60 and 70 are set so that when one valve opens more or less the other closes more or less. When the demand increases, the bell sinks, thereby opening wider the mixture-valve 56, opening wider the gas-valve 60, and reducing the opening of the air-valve 70, and vice versa, when the demand decreases. The proportion of hydrocarbon to air in the mixture, as well as the pressure in the bell, are thereby kept constant notwithstanding the variations of pressure.

To counteract the effect of variations of the temperature of the atmosphere within the carbureter, I provide an additional valve in one of the pipes 14 45, preferably in the gas-pipe 14. I control this valve by any suitable thermostat 63—such, for example, as that shown in Fig. 10. The valve is preferably placed concentrically inside the plug of the valve 60, which may be made hollow to contain it, the ports or passage-ways of the two concentric valves being arranged so that at normal temperature and demand both valves are fully open; but if the temperature of the atmosphere rises the thermostat partially closes the inner valve to let less gas pass into the mixing-chamber, the gas flowing through the valve being richer in consequence of the increase of temperature.

A further check on the quality of the mixture may be obtained by providing another valve in, say, the air-pipe 45, this valve being controlled by a thermostat 64 in accordance with the heat of a flame of the gas produced. The valve may be concentrically arranged inside the air-valve 70. The thermostat consists of a closed annular chamber 65, containing air or other suitable fluid upon which the flame impinges, this chamber being connected by a pipe 66 with a small cylinder 67, in which is a lightly spring-pressed piston 68, the movements of which under the changes of pressure of the fluid in the annular chamber and pipe control the valve.

Of course it will be readily understood that the apparatus is applicable for carbureting water-gas or the like, the gas which it is desired to enrich being passed instead of air through the carbureter.

As above stated, the means for automatically controlling the extent or amount of the carbureting-surface may be located both in the inlet-pipes to the carbureter or the outlets leading therefrom, and in Fig. 11 I show the said automatic means located in the outlet-pipes as well as in the inlet-pipes, said automatic means consisting of the valves $50^\times$, 51, 52, and 53. The stems of these valves are connected with a rod $64^\times$, which connects through a slot and a pin $62^\times$ $63^\times$ with an arm $61^\times$, forming an extension of the lever of the valve 44, before mentioned. The action of these valves is to increase or decrease the amount of the carbureting-surface in accordance with the demand, it being noted that the connections described are operated by the rise and fall of the bell.

Having now described my invention, what I claim as new, and desire to secure by Letters Patent, is—

1. In a carbureting apparatus, automatically-actuating means for controlling in accordance with the demand, the amount of carbureting-surface in operation, said means comprising valves in the delivery-pipe from the carbureting-surface, an expansible receptacle into which the carbureting fluid is delivered, and automatic means controlled simultaneously with the other means automatically controlled in accordance with the demand whereby the admission of carbureted fluid to the receptacle is regulated and the pressure therein is kept constant, notwithstanding variations of demand.

2. In carbureting apparatus, a series of carbureting elements, an air-inlet to each element, an outlet for carbureted fluid from each element, a valve in each outlet, a bell or the like movable responsive to the demand, and a connection between the valves and the bell, said valves being set to close or open successively, whereby more or less carbureting elements are put into operation according as the demand increases or decreases.

3. In a carbureting apparatus, means acting automatically to control the amount of carbureting-surface in operation in accordance with the temperature.

4. In a carbureting apparatus, means acting automatically to control the amount of carbureting-surface in operation in accordance with the demand, together with means acting to control the amount of carbureting-surface in operation in accordance with the temperature.

5. In a carbureting apparatus, means acting automatically to control the amount of carbureting-surface in operation in accordance with the demand, together with means acting to control the amount of carbureting-surface in operation in accordance with the temperature, a receptacle for carbureting fluid, said receptacle having movements responsive to the demand, and means for controlling the delivery of carbureted fluid into the receptacle in accordance with the demand, whereby the pressure in the receptacle is kept constant, notwithstanding variations in demand.

6. In carbureting apparatus, means for controlling the amount of carbureting-surface in operation, an expansible receptacle into which the carbureted fluid is delivered from the carbureter, a pipe conveying carbureted fluid from said receptacle, and a pipe conveying non-carbureted fluid, a second expansive receptacle containing a dilute mixture formed by mixing the contents of the two pipes, valves in said pipes, and means controlled by the movements of the second receptacle in accordance with the variations of demand, acting to operate said valves in opposite ways to each other, to admit to the second receptacle a greater volume of carbureted fluid in relation to the volume of non-carbureted fluid, when the demand increases, and vice versa when the demand decreases, whereby the proportion of hydrocarbon in the dilute mixture is kept constant.

7. In carbureting apparatus, means for controlling the amount of carbureting-surface in operation, an expansible receptacle, a pipe connecting the outlet of the carbureter with the expansive receptacle, a delivery-pipe in the receptacle, and valve in the first-mentioned pipe, and means continuously controlled by the movement of said expansive receptacle whereby the said valve is opened or closed in accordance with the demand.

8. In carbureting apparatus, means for controlling the amount of carbureting-surface in operation, an expansible receptacle into which the carbureted fluid is delivered from the carbureter, a pipe conveying carbureted fluid from said receptacle and a pipe conveying non-carbureted fluid, a mixing-chamber into which both of said pipes deliver, a pipe connecting said mixing-chamber with a second expansive receptacle, a valve in each of said pipes operated in accordance with the movements of the expansive receptacle as the demand varies, the valves in the non-carbureted-fluid pipe from the first expansive receptacle being set to operate in opposite directions to one another, and valve means controlled in accordance with the demand, whereby the pressure of the fluid in the receptacle is maintained constant notwithstanding variations in demand.

9. In carbureting apparatus, means for controlling the amount of carbureting-surface in operation, an expansible receptacle into which the carbureted fluid is delivered from the carbureter, a pipe conveying carbureted fluid from said receptacle, and a pipe conveying non-carbureted fluid, a second expansive receptacle containing a dilute mixture formed by mixing the contents of the two pipes, valves in said pipes, and means controlled by the movements of the second receptacle in accordance with the variations of demand, acting to operate said valves in opposite ways to each other, to admit to the second receptacle a greater volume of carbureted fluid in relation to the volume of non-carbureted fluid, when the demand increases, and vice versa when the demand decreases, whereby the proportion of hydrocarbon in the dilute mixture is kept constant, and means operated from a part having movements in accordance with the demand, whereby the pressure of the carbureted fluid is maintained constant notwithstanding the variations in the demand.

10. In carbureting apparatus, means acting automatically to control the amount of carbureting-surface in operation in accordance with the demand, thermostatically-operated means acting to control the surface in accordance with the temperature, and means for maintaining the pressure of the carbureted fluid constant.

In testimony whereof I affix my signature in presence of two witnesses.

THOMAS HENRY GLASSCOE.

Witnesses:
ALBERT E. PARKER,
P. LEAFORD.